Oct. 6, 1925.
L. DOUCETT
1,556,502
SAFETY DEVICE FOR AEROPLANES
Filed March 9, 1925
2 Sheets-Sheet 1
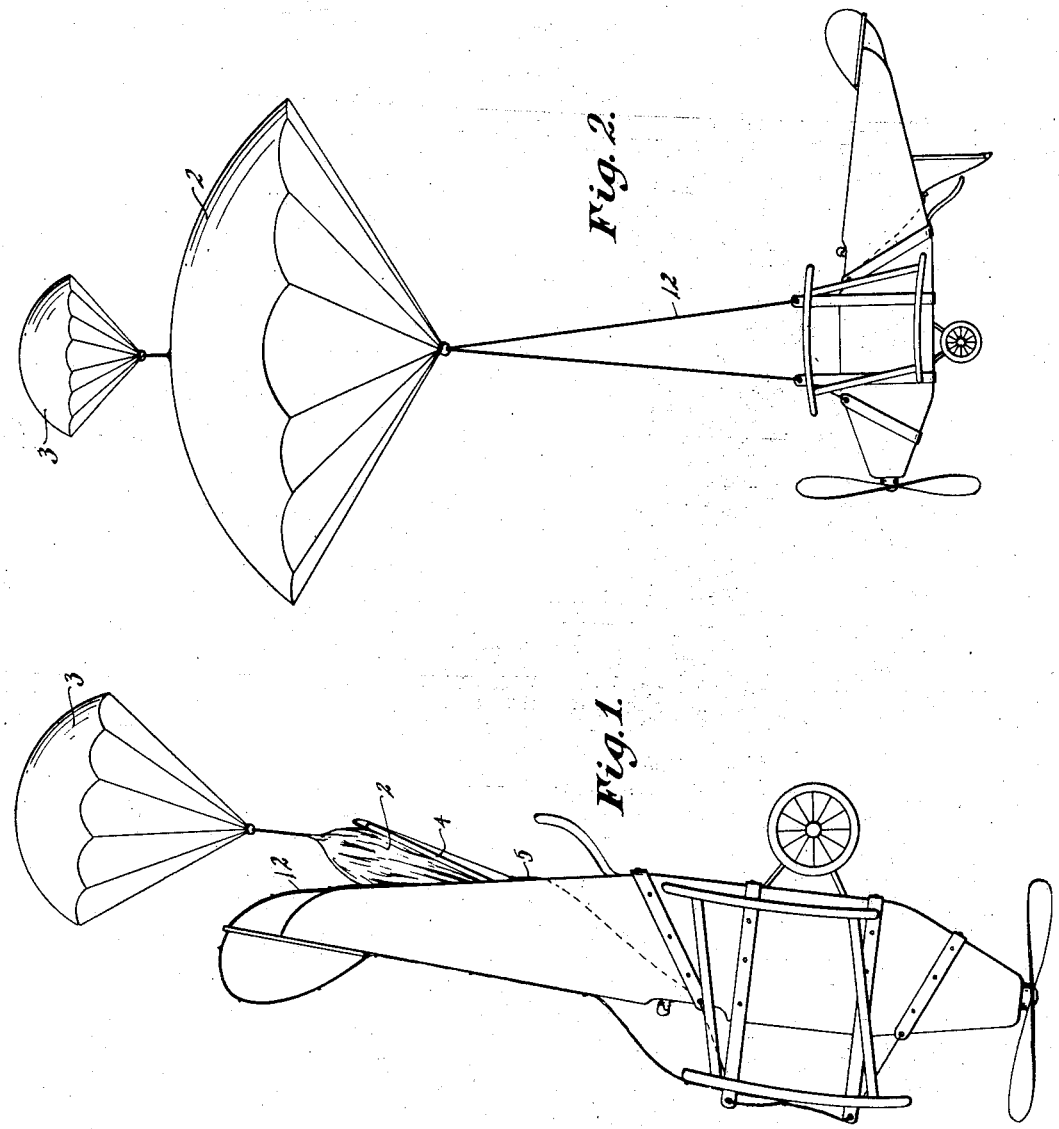
Lillian Doucett,
INVENTOR
BY *Victor J. Evans,*
ATTORNEY
WITNESS:

Oct. 6, 1925.

L. DOUCETT 1,556,502

SAFETY DEVICE FOR AEROPLANES

Filed March 9, 1925

Lillian Doucett,
INVENTOR

BY Victor J. Evans,
ATTORNEY

WITNESS:

Patented Oct. 6, 1925.

1,556,502

UNITED STATES PATENT OFFICE.

LILLIAN DOUCETT, OF SAN DIEGO, CALIFORNIA.

SAFETY DEVICE FOR AEROPLANES.

Application filed March 9, 1925. Serial No. 14,173.

*To all whom it may concern:*

Be it known that I, LILLIAN DOUCETT, a citizen of the United States, residing at San Diego, in the county of San Diego and State of California, have invented new and useful Improvements in Safety Devices for Aeroplanes, of which the following is a specification.

This invention relates to a safety device for aeroplanes, the general object of the invention being to provide a parachute for easying the descent of a disabled plane to the ground and thus prevent injury to the occupants and to the plane itself.

Another object of the invention is to provide a container within the fuselage of the plane for the parachute with means for attaching the cables from the parachute to a reinforced frame attached to the central part of the fuselage so that the plane will be supported in horizontal position by the parachute with easily breakable means for holding the cables to the fuselage when the parachute is not in use.

Another object of the invention is to provide a small parachute for pulling the main parachute out of the housing with a trap door in the housing, with means for opening it by the pilot for releasing the small parachute.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view showing a fallen aeroplane with the small parachute in the act of pulling the large parachute from the housing.

Figure 2 is a view showing the parachutes supporting the aeroplane in horizontal position.

Figure 4:
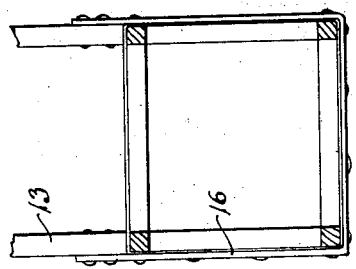
Figure 4 is a section on line 4—4 of Figure 3.
Figure 3:
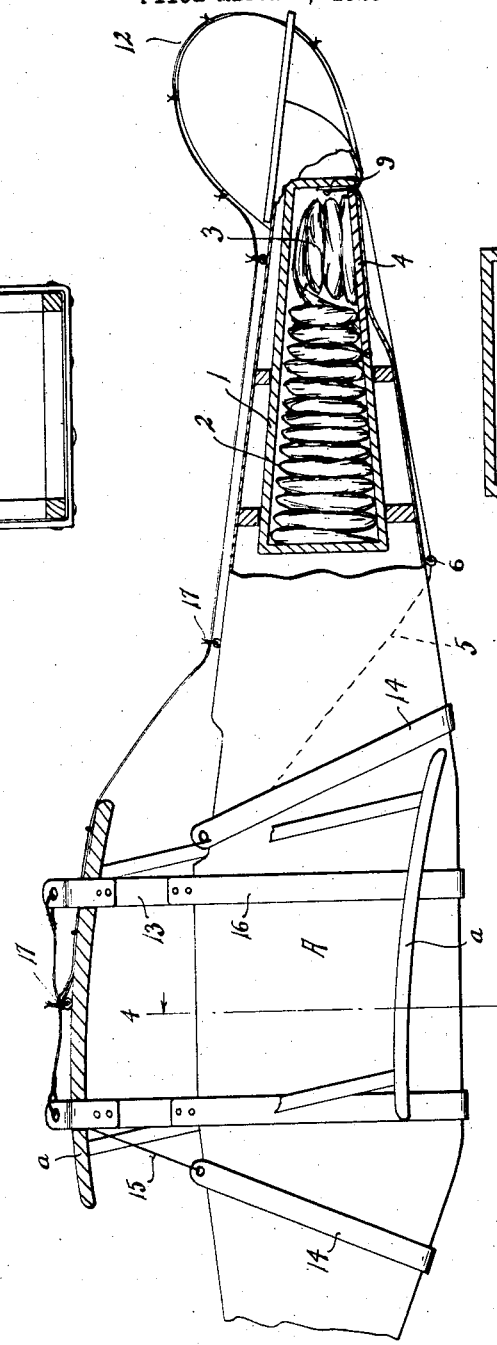
Figure 3 is an enlarged view of the fuselage of the plane with parts in section.
Figure 5:
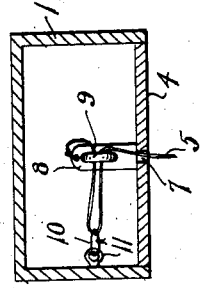
Figure 5 is a sectional view showing the means for holding the trap door of the housing in closed position.

In these views, A indicates the fuselage of an aeroplane and $a$ the planes thereof. In carrying out my invention I place a housing 1 in the fuselage towards the rear thereof, this housing being designed to hold, in folded position, a large parachute 2 and a small parachute 3. The housing is provided with a trap door 4 which is positioned directly under the small parachute so that when it is opened the small parachute will drop from the housing. This trap door is adapted to be opened by the pilot or other occupant of the plane through means of a cable 5 which extends from the cock pit over suitable guiding pulleys 6 through a hole 7 in the trap door and has its end attached to a hasp 8 on the door and which engages a staple 9 in the housing. A portion of the cable is looped and passed through the staple to hold the hasp in closed position and then this looped part is fastened by a string 10 to an eye 11 on the housing. Thus the cable will hold the door in closed position but when the cable is pulled upon the string 10 will break so that the looped part of the cable will be pulled from the staple and then the hasp will be pulled off the staple and the door opened. Then the small parachute 3 will drop through the trap door and will catch the wind and then this small parachute will pull the large parachute from the housing. Cables 12 are fastened to the large parachute and to the upper ends of posts 13 which are fastened to the fuselage and have their upper ends passing through the upper wing $a$. These posts are braced by the straps 14 which pass around the body and are connected with the upper ends of the post by the wires 15 and by the straps 16 which are fastened to the posts and extend around the lower portion of parts of the frame of the aeroplane. The cables are fastened to parts of the body and to the rudder by easily breakable strings 17. These strings will hold the cables in a position where they will be out of the way but as soon as the plane starts to fall and the pilot opens the trap door the small parachute will drop from the housing and thus pull the large parachute from the housing, as shown in Figure 1, and as soon as the large parachute opens up it will exert a pull upon the cables, thus breaking the strings 17 until the parts assume the position shown in Figure 2, where the plane will be supported in horizontal position by the parachutes and it will thus descend to the ground slowly and alight without damage to itself or to the occupants.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A safety device for an aeroplane comprising a parachute, a housing within the fuselage for containing the parachute, a reinforced frame attached to the fuselage, cables connecting the parachute with the frame so that the parachute when opened will hold the plane in horizontal position, breakable means for holding the cables against portions of the aeroplane when the parachute is in its housing and means for permitting an occupant of the plane to remove the parachute from the housing.

2. A safety device for an aeroplane comprising a parachute, a housing within the fuselage for containing the parachute, a reinforced frame attached to the fuselage, cables connecting the parachute with the frame so that the parachute when opened will hold the plane in horizontal position, breakable means for holding the cables against portions of the aeroplane when the parachute is in its housing, means for permitting an occupant of the plane to remove the parachute from the housing, such means comprising a trap door in the housing, a cable leading to the cock pit for opening the trap door, a small parachute arranged to drop through the door when the same is opened and means for connecting the small parachute to the large parachute so that the small parachute will pull the large parachute through the door opening.

In testimony whereof I affix my signature.

LILLIAN DOUCETT.